United States Patent [19]

Moody et al.

[11] Patent Number: 5,520,820
[45] Date of Patent: May 28, 1996

[54] PROCESS FOR FLOCCULATING SUSPENDED SOLIDS

[75] Inventors: Gillian M. Moody, West Yorkshire; Trevor K. Hunter, Leeds, both of United Kingdom

[73] Assignee: Allied Colloids Limited, West Yorkshire, England

[21] Appl. No.: 256,759

[22] PCT Filed: Jan. 22, 1993

[86] PCT No.: PCT/GB93/00146

§ 371 Date: Sep. 22, 1994

§ 102(e) Date: Sep. 22, 1994

[87] PCT Pub. No.: WO93/14852

PCT Pub. Date: Aug. 5, 1993

[30] Foreign Application Priority Data

Jan. 24, 1992 [GB] United Kingdom ............... 9201583

[51] Int. Cl.[6] ........................................ B01D 21/01
[52] U.S. Cl. ................... 210/734; 209/5; 423/121; 423/122; 210/733
[58] Field of Search .................... 209/5; 210/725, 210/727, 728, 732–734; 423/111, 121, 122, 130

[56] References Cited

U.S. PATENT DOCUMENTS

| | | | |
|---|---|---|---|
| 3,390,959 | 7/1968 | Sibert | 423/122 |
| 3,445,187 | 5/1969 | Sibert | 210/734 |
| 3,784,526 | 1/1974 | Ribba | 260/78.5 R |
| 4,519,920 | 5/1985 | Fukumoto et al. | 210/701 |
| 4,608,237 | 8/1986 | Roe et al. | 423/122 |
| 5,217,620 | 6/1993 | Mahoney et al. | 210/728 |

FOREIGN PATENT DOCUMENTS

| | | | |
|---|---|---|---|
| 52-85287 | 7/1977 | Japan | C08F 220/56 |
| 402530 | 5/1972 | U.S.S.R. | C08F 15/02 |
| 842041 | 8/1978 | U.S.S.R. | C02F 1/56 |
| 1028683 | 7/1983 | U.S.S.R. | C08F 220/06 |

*Primary Examiner*—Peter A. Hruskoci
*Attorney, Agent, or Firm*—Sughrue, Mion, Zinn, Macpeak & Seas

[57] ABSTRACT

Water soluble polymer flocculants are formed from monomers derived from ethylenically unsaturated dibasic carboxylic acids of formula (I) where $R^1$=H and $R^2$=COOH or $R^1$=COOH and $R^2$=H. Flocculants are provided for use in Bayer process liquors which are copolymers of acids of formula (I) with ethylenically unsaturated copolymerisable monomer and which have molecular weight above 300,000. Preferably the polymer is a terpolymer of dibasic acid, monobasic and polymerisable termonomer. A particularly preferred flocculant is formed from at least 10 mol % maleic acid with acrylic acid and acrylamide as comonomers and is used preferably for flocculation of red mud in the primary settler and/or the various red mud washing stages.

5 Claims, No Drawings

PROCESS FOR FLOCCULATING SUSPENDED SOLIDS

The present invention relates to water soluble copolymers formed from ethylenically unsaturated dibasic carboxylic acids of formula (I):

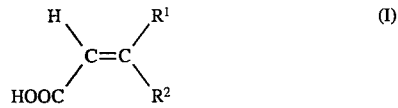

where $R^1=H$ and $R^2=COOH$ or $R^1=COOH$ and $R^2=H$ and the use of the copolymers as flocculating agents, especially in Bayer process liquors.

Water soluble anionic polymers formed from ethylenically unsaturated dibasic acids and ethylenically unsaturated monobasic acids are known to be useful as metal sequestrants, as builders for detergents, and as scale inhibitors. For instance U.S. Pat. No. 4,519,920 describes copolymers of maleic acid and (meth)acrylic acid having molecular weight up to 8,000, useful as scale inhibitors. The polymers are made by continuously feeding the (meth)acrylic acid during polymerisation to a solution of half-neutralised maleic acid. The aqueous solution of the polymeric product is subsequently neutralised by the use of alkali metal hydroxides or carbonates.

EP-A-0106111, EP-A-0106110, EP-A-076992 and EP-A-075820 all disclose copolymers of a monoethylenically unsaturated dicarboxylic acid derived compound with a monoethylenically unsaturated monocarboxylic acid derived compound. These copolymers are of low molecular weight and are useful as scale inhibitors in detergent compositions.

Higher molecular weight copolymers of ethylenically unsaturated dibasic carboxylic acids are known for use as coagulants or flocculants. For instance CN-A-1032925 describes the use of an acrylamide/maleic anhydride copolymer as a coagulant to assist the multi-stage flocculation process for washing hydrated titanium dioxide. SU-A-1,411,297 describes the use of a neutralised copolymer of acrylic acid and maleic anhydride having molecular weight about $1 \times 10^6$ as a flocculant for the treatment of aqueous effluent, especially sewage effluent, flocculation. In SU-A-1,028,683 a terpolymer of ammonium maleate, (meth)acrylic acid and ammonium (meth)acrylate is used to flocculate suspended matter from aqueous wastes from galvanic processes. In SU-B-842,041 a copolymer of maleic acid and acrylamide is used to remove suspended matter from impure water. In JP-A-52085287 (1977) a copolymer of acrylamide and up to 5 wt. % ethylenically unsaturated dicarboxylic acid is used as a sedimentation aid and a flocculant. In SU-A-402,530 copolymers of acrylamide with either maleic acid or fumaric acid are used as flocculants. In JP-A-47020078 (1972) acrylic and maleic acid are copolymerised in aqueous solution to form flocculant polymer. There are also several disclosures by Asanov et al and from Dzhalilova et al describing the use of copolymers of maleic acid with either acrylic acid or acrylamide and their use as flocculants for various substrates, including bentonite, sulphur and in water purification. Florea et al in Bul. Univ. Galati, Fasc. 6, 3, 23-32 (1980) and Chem. Abs. 96:102647, describe the use of copolymers of acrylic acid and maleic acid as flocculants for the treatment of sugarbeet juices and for clarifying wines.

U.S. Pat. No. 3,784,526 describes the use of terpolymers of itaconic acid with acrylamide and acrylic acid as a flocculant for various media, including dispersions of red mud from bauxite treatment in the Bayer process. The present inventors have found, however, that the use of itaconic acid can lead to difficulties in polymerisation.

In U.S. Pat. No. 4,608,237 the use of anionic polymers or copolymers of acrylic acid are described as crystal modifiers for addition to pregnant Bayer process liquors to minimise interference by sodium oxalate crystals. The polymer which can be provided in the form of a solution, water-in-oil emulsion, dry solid or gel form, may include comonomers, one less preferred example of which is maleic anhydride.

U.S. Pat. No. 4,845,192 describes a procedure for extruding and dissolving gel form flocculant polymers and copolymers prior to their use as flocculants. Examples of copolymers for which the process may be used are polyacrylamides and copolymers of acrylamide with, inter alia, maleic anhydride. The process is said to be of use for the dissolution of polymers for a variety of thickening and flocculating uses.

According to a first aspect of the present invention the removal of suspended solids from Bayer process liquors is carried out in the presence of a flocculant polymer which comprises a copolymer of units derived from ethylenically unsaturated dibasic carboxylic acids of formula (I):

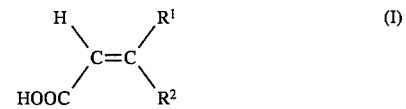

where $R^1=H$ and $R^2=COOH$
or $R^1=COOH$ and $R^2=H$
with units derived from ethylenically unsaturated copolymerisable monomer, the polymer having a molecular weight of at least 300,000.

In this invention when we say the polymer comprises units "derived from" particular monomers, we intend to cover polymers in which the carboxylic acid moieties units are in the free acid form, in neutralised form where the counterion is organic or inorganic and is preferably alkali metal or ammonium, or in anhydride form. Likewise monomers used to make the polymer may be in free acid, neutralised or anhydride form.

The flocculant polymer preferably has a molecular weight of at least 500,000, more preferably at least 1,000,000 or more. The intrinsic viscosity(at 25° C. in 1M NaCl buffered to pH 7.0 with 0.1M sodium phosphate) is preferably at least 1 dl/g, more preferably at least 5 dl/g, for instance more than 10 dl/g.

The flocculant polymer used in this aspect of the invention is a copolymer of a dibasic acid of formula (I) with a copolymerisable monomer.

Maleic acid is the preferred monoethylenically unsaturated dibasic carboxylic acid monomer. At low levels of incorporation of dibasic acid monomer (eg 8%) flocculant polymers formed using fumaric acid monomer have molecular weight comparable with those formed using maleic acid monomer. At high levels of incorporation of dibasic acid monomer, however, the use of maleic acid monomer results in polymers with a higher molecular weight than the molecular weights of polymers based on fumaric acid monomer. It is possible to use a mixture of acids according to formula (I).

The copolymerisable monomer may be non-ionic, anionic or cationic, most preferably non-ionic or anionic. A mixture of copolymerisable monomers may be used. The monomer is preferably selected from sulphonic and carboxylic acid monomers, especially AMPS and (meth)acrylic acid, and nonionic monomers, for instance selected from (meth)acrylamide, vinyl acetate, lower alkylene, aromatic vinylic compounds, lower alkyl (meth)acrylates, lower alkyl (meth)acrylamides. Preferably the comonomer comprises (meth)acrylic acid and/or (meth)acrylamide.

The flocculant polymer preferably comprises at least 5 mol % units derived from maleic and/or fumaric acid, more preferably at least 10 mol %, for instance 20 mol % or more, for instance up to 50 mol %.

In this invention the polymer is preferably provided in a form such that the carboxylic acid groups are wholly or partially neutralised, for instance by being present in the form of alkali metal, ammonium or amine salts. Usually at least 50%, preferably at least 80%, more preferably substantially 100% of the carboxylic acid groups present in the polymer are neutralised.

The flocculant polymer is preferably formed from monomer components such that the anionic content is preferably at least 0.50 meq/g. The anionic content is calculated from the starting monomer mixture and assuming 100% conversion, the weight of polymer including the weight of any counterions, which may be added in a post-neutralisation step.

The Bayer process liquors which are treated according to the second aspect of the invention are preferably those which have as the main dispersed solid phase red mud. The liquors may thus be that settled in the primary settler and/or the various red mud washing stages. Alternatively or additionally the liquor may be the pregnant liquor treated before passing through the Kelly filter to clarify before precipitation of alumina trihydrate. The flocculants may also be used in the separation of precipitated alumina trihydrate.

The invention is of particular benefit in the settlement and washing of red mud. In such processes the flocculant polymers used down the washing train may differ from one another, for instance by having gradually decreasing ionicity.

The polymer may be used in conjunction with other natural or synthetic flocculant polymers known to be useful for the treatment of red mud-containing liquors. For instance the flocculant polymers may be used in conjunction with dextran as described in our copending application EP-A-0367437 or with starch based flocculants. The flocculant polymer may be used in conjunction with other chemical additives, for instance, with lime as described in our copending application EP-A-0352030.

According to a second aspect of the present invention, a new process is provided of flocculating suspended solids from a suspension using a water soluble polymer flocculant comprising units a), b) and c) derived from at least three ethylenically unsaturated monomers, in which the units are derived from the following compounds:

a) ethylenically unsaturated dibasic carboxylic acids of formula (I):

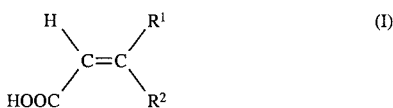

(I)

where $R^1$=H and $R^2$=COOH
or $R^1$=COOH and $R^2$=H b) ethylenically unsaturated monobasic carboxylic acids c) copolymerisable termonomer selected from non-ionic, cationic and anionic ethylenically unsaturated compounds and the polymer has a molecular weight of at least 300,000.

In this aspect of the invention also the polymer is preferably provided in a form such that the carboxylic acid groups are wholly or partially neutralised, for instance by being present in the form of alkali metal, ammonium or amine salts. Usually at least 50%, preferably at least 80%, more preferably substantially 100% of the carboxylic acid group present in the polymer are neutralised.

The units a are preferably derived from maleic acid, in which $R^1$=H and $R^2$=COOH.

In this aspect of the invention the units b are preferably derived from acrylic, methacrylic, crotonic or pentenoic acid, most preferably acrylic acid. Mixtures of b units may be used.

The units c are preferably derived from copolymerisable nonionic or anionic compounds. Anionic compounds are for instance 2-acrylamido 2-methylpropane sulphonic acid (AMPS) or vinylsulphonic acid. Copolymerisable nonionic compounds are for instance lower alkyl esters of (meth)acrylic acid, lower alkyl amide derivatives of (meth)acrylamide, lower alkalene, aromatic vinyl compounds, or, most preferably (meth)acrylamide, most preferably acrylamide. Mixtures of two or more termonomer may be used. With respect to the first aspect of the invention, the flocculant polymer used therefore is most conveniently the flocculant terpolymer of this second aspect of the invention.

The flocculant polymer has a molecular weight of at least 300,000, preferably at least 500,000, more preferably at least 1,000,000 or more. The intrinsic viscosity (at 25° C. in 1M NaCl buffered to pH 7.0 with 0.1M sodium phosphate) is preferably at least I dl/g, more preferably at least 5 dl/g, for instance more than 10 dl/g.

The flocculant polymer according to the second aspect of the invention preferably comprises at least 5 mol. % units derived from the dibasic carboxylic acid of formula (I), more preferably at least 10 mol. %, for instance 20 mol. % or more for instance up to 50 mol %. Units b are generally present in an amount of at least 5 mol. %, more preferably at least 10 mol. %, most preferably 20 mol. % or more. Units derived from c are present in an amount of at least 1 mol. %, preferably at least 5 mol. %, for instance more than 10 mol. %.

The polymer is preferably formed from monomer components such that the anionic content of the polymer is at least 0.055 meq/g, more preferably at least 0.1 meq/g. The anionic content is calculated from the starting monomer mixture and assuming 100% conversion, the weight of polymer including the weight of any counterions, which may be added in a post-neutralisation step. For some applications, especially in the Bayer process, the anionic content is preferably at least 0.50 meq/g.

The new flocculant polymer may be used for the separation of suspended matter from aqueous liquors, where anionic polymers are generally useful. Artionic polymers are generally used to remove inorganic suspended materials from aqueous liquors. The suspended solids may thus be minerals such as clays or mineral ores. The polymers are found to be particularly useful in various mining industry applications. Polymers which have a very high anionic content are found to be of particular use in the treatment of Bayer process liquors.

The flocculant polymers of both aspects of this invention may be produced in the form of a low concentration aqueous solution, by inverse phase emulsion or suspension polymerisation or by bulk aqueous (gel) polymerisation. In each of these processes the starting monomers are dissolved in aqueous solution. It is possible for one or more of the monomers to be added after polymerisation has started, for instance, by continuous gradual addition of one monomer which is more reactive than the others which may help to maintain a relatively constant polymer composition throughout the polymerisation. It is generally, however, unnecessary to use that technique and preferably all of the monomers are dissolved in the solution before polymerisation starts.

Where the total concentration of monomers in aqueous solution is relatively low, the polymer product may remain a pourable liquid, in which case it may be subsequently sold as such. Where the aqueous solution has a relatively high concentration of monomer, for instance more than 10%, for instance more than 25%, up to 50% or more, the product is generally a gel. The gel is preferably subsequently dewatered, by known techniques such as solvent extraction or direct drying, and comminuted to form a dry powder.

Where the polymerisation is an inverse phase polymerisation, the aqueous monomer phase is dispersed into water-immiscible solvent. An inverse emulsion polymerisation is conducted in the presence of emulsifier and the droplets formed are small, for instance less than 5 µm in diameter, especially around 1 or less than 1 µm in diameter. Where the polymerisation is an inverse suspension polymerisation, the aqueous phase is dispersed into the organic phase in the presence of an amphipathic polymeric stabiliser (known per se), and the droplets formed are relatively large, for instance more than 50 µm in diameter, usually at least 100 µm in diameter, up to 500 µm.

The product of an emulsion polymerisation may be subsequently sold and used as such. Alternatively it may be recovered as a solid, by known procedures in which the dispersed phase is coagulated before or after dewatering. Alternatively the liquid, emulsion product may be dewatered and then sold as a liquid product. The product of a suspension polymerisation is recovered in dry form, by dewatering, usually by azeotropic distillation and then separation of the dry beads from the organic solvent.

Flocculant polymers according to the invention may be provided by a process in which acids of formula (I) are copolymerised with an ethylenically unsaturated anionic comonomer, in which the monomers are polymerised in substantially wholly neutralised form and dissolved in aqueous solution, and the product polymer is subsequently recovered as a solid.

The process of polymerisation is, for instance, conducted as an aqueous gel polymerisation or an inverse phase suspension polymerisation. The monomers may all be dissolved in the aqueous solution before polymerisation of a portion of one of the monomers may be added after polymerisation has started for instance continuously.*

It is usually preferred for the flocculant polymer to be provided for use in a partially or wholly neutralised form. It is most convenient for the neutralisation to be carried out on the monomers rather than on the product polymer. The monomer starting materials to be used in the process for producing the polymer are therefore usually provided in partially or, preferably, wholly neutralised form, for instance in the form of the-alkali metal salt or ammonium or amine salt. Where the raw materials are provided in the acid or anhydride form neutralisation is conducted by dissolution of the starting materials into aqueous solutions of, for instance, alkali metal hydroxide or ammonia, as the case may be.

It is necessary for the acid of formula (I), or its anhydride if applicable, used to form the flocculant polymer material to be in its wholly neutralised form, when the product is required to be supplied in its neutralised form, since the half neutralised form of the acid has low solubility in water.

In the process the polymerisation may be initiated using conventional systems. The initiation may be by irradiation, optionally in the presence of photosensitiser components, or, preferably, may be initiated by free radicals formed chemically, for instance by the use of a redox couple or by thermal initiators, which decompose to form free radicals above a certain temperature. In many instances it may be convenient to use a combination of redox and thermal initiation.

The amount of initiator and the polymerisation conditions (including the concentration of monomer, temperature of initiation and polymerisation, rate of reaction, control of retarders, inhibitors, chain transfer agents, crosslinking agents and other compounds which may interfere with the polymerisation, and the recovery procedures) are controlled by techniques known to those skilled in the art, to achieve the desired molecular weight whilst retaining adequate water solubility.

The flocculant polymer product may be mixed with diluents or with other flocculant ingredients, or admixed with additives which can assist in the storage stabilisation of the polymer or its subsequent use as a flocculant, to form a composition.

By the use of the present invention it has been found that very cost efficient flocculation of Bayer process liquors can be achieved. The use of the flocculant polymers gives low under flow solids volume (i.e. the separated solid contains low amounts of liquid), as well as high degrees of clarity for the supernatant liquor, i.e. achieves good overall solids removal. It is believed that these results are due in part to the use of very high artionic content polymers, and in part to the achievement of very high molecular weight for maleic acid containing polymers, which hitherto have not been achieved. The flocculants may be produced from monomers which are cheap, readily available and easy to polymerise.

The following examples illustrate the invention:

EXAMPLES

In all of the following examples slurries of Bayer process liquors are made up from the individual components so as to simulate the liquor at various stages of the red mud circuit. The slurry, once made up, is treated with the flocculant polymer under test at the stated dose level, by a process in which the rate of settlement of solids from the liquor is determined by following the rate at which the level of the solids drops in a measuring cylinder, the volume of the underflow solids settled out after the process is recorded, and the clarity of the supernatant is determined in a "wedge" test. In this last test, the supernatant liquor is placed into a vessel which has a wedge shape, with the point of the wedge facing downwards. The rear face of the transparent container is marked with a series of graduations from 0 to 46, the highest of which is at the top of the wedge. The number recorded for the wedge test is the highest number which can be seen clearly through the solution in the container.

In these tests therefore a product which has suitable properties gives a high settlement rate, a low underflow volume and a high reading for the supernatant clarity wedge reading. In general in the tests the comparative product against which the products of the invention are compared is of the optimum sodium acrylate/acrylamide copolymer ratio on our range previously used on the liquor and of a similar molecular weight to the products of the invention. In each instance the polymer products of the invention were made by a process in which maleic anhydride was dissolved.

Example 1

A red mud slurry was formed having a composition such as to simulate that of a primary thickener feed. Such a slurry is formed of 30 g/l red mud solids in a liquor containing 200 g/l NaOH and 50 g/l Na$_2$CO$_3$ and maintained at 90° C. High molecular weight water soluble anionic flocculants, as listed below, were added at 1, 2 & 3 mg/l. The settlement rate of solids was recorded in centimeters per minute. The volume of the settled underflow was recorded after 10 minutes settlement and the clarity of the supernatant was recorded after 10 minutes settlement.

|  | Acrylamide | Sodium acrylate | Sodium maleate | IV |
|---|---|---|---|---|
| Comparative Product A | 5 | 95 | — | 13.9 |
| Product A | 5 | 85 | 10 | 13.8 |

In aqueous hydroxide of a concentration sufficient to neutralise the maleic anhydric fully to form disodium maleate, any comonomer was then added to the solution, such that other acids were fully neutralised. The total monomer concentration in the aqueous solution was 20–50%, typically 30%. To the aqueous solution was then added a free radical initiator system consisting of a redox initiator pair in combination with a thermal initiator and polymerisation allowed to free rise to completion. The polymer was recovered as a powder by chopping the wet gel and drying it in a fluid bed drier at about 60° C. then grinding the dried particles to a particle size of about 500 μm.

| PRODUCT | DOSE (mg/l) | SETTLE-MENT RATE (cm/min) | UNDER-FLOW VOLUME (cm$^3$) | SUPER-NATANT CLARITY WEDGE READING |
|---|---|---|---|---|
| Comparative Product A | 1 | 7.9 | 91 | 9 |
|  | 2 | 40.0 | 68 | 7 |
|  | 3 | 72.6 | 59 | 8 |
| Product A | 1 | 14.5 | 87 | 10 |
|  | 2 | 53.6 | 64 | 8 |
|  | 3 | 113.2 | 56 | 11 |

The inclusion of sodium maleate provides benefit in terms of increased settlement rate, lower underflow volume and better supernatant clarity.

Example 2

A red mud slurry was formed having a composition such as to simulate that of a typical 1st Washer. Such a slurry is formed of 30 g/l red mud solids in a liquor containing 96 g/l NaOH and 24 g/l Na$_2$CO$_3$ and maintained at 80° C. High molecular weight water soluble anionic flocculants, as in Example 1, were added at 1, 2 & 3 mg/l.

The remaining procedures was as in Example 1.

| PRODUCT | DOSE (mg/l) | SETTLE-MENT RATE (cm/min) | UNDER-FLOW VOLUME (cm$^3$) | SUPER-NATANT CLARITY WEDGE READING |
|---|---|---|---|---|
| Product A | 1 | 12.3 | 82 | 27 |
|  | 2 | 71.1 | 58 | 32 |
|  | 3 | 114.1 | 53 | +46 |
| Comparative Product A | 1 | 13.76 | 85 | 42 |
|  | 2 | 40.4 | 66 | 37 |
|  | 3 | 96.2 | 56 | +46 |

The inclusion of sodium maleate provides benefits in terms of increased settlement rate and lower underflow volumes. Supernatant clarities are slightly worse than when no maleate is present, but acceptable.

Example 3

A slurry as in example 2 was used, and products as listed below were added at 1, 2 & 3 mg/l. The remaining test procedure is as in Example 1.

| Product | Acrylamide % | Sodium Acrylate % | Sodium Maleate % | I.V. |
|---|---|---|---|---|
| Product B1 | 10 | 81 | 9 | 16.1 |
| Product B2 | 10 | 72 | 18 | 16.0 |
| Product B3 | 10 | 63 | 27 | 15.1 |
| Comparative Product B | 10 | 90 | — | 16.0 |

| PRODUCT | DOSE (mg/l) | SETTLE-MENT RATE (cm/min) | UNDER-FLOW VOLUME (cm$^3$) | SUPER-NATANT CLARITY |
|---|---|---|---|---|
| Product B1 | 1 | 22.2 | 74 | 18 |
|  | 2 | 70.6 | 60 | 18 |
|  | 3 | 95.2 | 56 | 29 |
| Product B2 | 1 | 12.9 | 83 | 26 |
|  | 2 | 59.3 | 61 | 18 |
|  | 3 | 87.2 | 57 | 26 |
| Product B3 | 1 | 9.6 | 89 | 42 |
|  | 2 | 41.4 | 63 | 20 |
|  | 3 | 109.1 | 55 | 44 |
| Comparative Product B | 1 | 9.6 | 93 | 40 |
|  | 2 | 24.2 | 80 | 26 |
|  | 3 | 46.2 | 65 | 24 |

Inclusion of sodium maleate increases the settlement rate obtained and provides a decrease in underflow volume. Supernatant clarities are all similar, but improve as sodium maleate content increases.

Example 4

A red mud slurry was formed having a composition such as to simulate that of a typical 2nd Washer. Such slurry is formed of 40 g/l red mud solids in a liquor containing 6 g/l NaOH and 14 g/l Na$_2$CO$_3$. High molecular weight water soluble anionic flocculants, as in Example 3 were added at 3, 4 & 5 mg/l.

The remaining procedure was as in Example 3.

| PRODUCT | DOSE (mg/l) | SETTLE-MENT RATE (cm/min) | UNDER-FLOW VOLUME (cm$^3$) | SUPER-NATANT CLARITY WEDGE READING |
|---|---|---|---|---|
| Product B1 | 3 | 7.8 | 120 | 15 |
|  | 4 | 30.9 | 96 | 9 |
|  | 5 | 49.7 | 87 | 11 |
| Product B2 | 3 | 4.4 | 138 | 14 |
|  | 4 | 25.4 | 97 | 9 |
|  | 5 | 41.6 | 91 | 10 |
| Product B3 | 3 | 4.0 | 147 | 18 |
|  | 4 | 9.3 | 114 | 14 |
|  | 5 | 18.1 | 103 | 11 |
| Comparative Product B | 3 | 8.2 | 130 | 15 |
|  | 4 | 19.2 | 109 | 13 |
|  | 5 | 28.3 | 100 | 12 |

On this slurry an optimum sodium maleate content is observed with product B1.

Example 5

A slurry as in Example 4 was used. High molecular weight water soluble anionic flocculants, as listed below, were added at 2, 3 & 4 mg/l. The settlement rate of solids was recorded in centimeters per minute. The volume of the settled underflow was recorded after 10 minutes settlement and the clarity of the supernatant was recorded after 10 minutes settlement.

| Product | Acrylamide % | Sodium Acrylate % | Sodium Maleate % | I.V. |
|---|---|---|---|---|
| Product C1 | 20 | 72 | 8 | 15.6 |
| Product C2 | 20 | 64 | 16 | 16.1 |
| Product C3 | 20 | 56 | 24 | 15.4 |
| Comparative Product C | 20 | 80 | 0 | 16.0 |

| PRODUCT | DOSE (mg/l) | SETTLEMENT RATE (cm/min) | UNDERFLOW VOLUME (cm³) | SUPERNATANT CLARITY WEDGE READING |
|---|---|---|---|---|
| Product C1 | 2 | 7.5 | 127 | 18 |
|  | 3 | 29.6 | 98 | 14 |
|  | 4 | 48.2 | 89 | 14 |
| Product C2 | 2 | 8.7 | 123 | 15 |
|  | 3 | 34.4 | 94 | 12 |
|  | 4 | 80.7 | 84 | 14 |
| Product C3 | 2 | 5.4 | 132 | 22 |
|  | 3 | 10.9 | 113 | 18 |
|  | 4 | 64.8 | 85 | 17 |
| Comparative Product C | 2 | 13.1 | 117 | 17 |
|  | 3 | 30.5 | 98 | 16 |
|  | 4 | 51.6 | 88 | 15 |

Results tend to improve as maleate content increases, although optimum results are obtained with Product C2.

Example 6

A red mud slurry was formed having a composition such as to simulate that of a 5th→Final Washer Feed. Such a slurry is formed of 50 g/l red mud solids in a liquor containing 25 g/l NaOH. High molecular weight, water soluble anionic flocculants as listed below were added at 1, 2 & 3 mg/l. The remaining procedure was as in Example 1.

| Product | Acrylamide % | Sodium Acrylate % | Sodium Maleate % | I.V. |
|---|---|---|---|---|
| Product D1 | 50 | 45 | 5 | 19.0 |
| Product D2 | 50 | 40 | 10 | 19.0 |
| Product D3 | 50 | 35 | 15 | 19.8 |
| Comparative Product D | 50 | 50 | — | 19.3 |

| PRODUCT | DOSE (mg/l) | SETTLEMENT RATE (cm/min) | UNDERFLOW VOLUME (cm³) | SUPERNATANT CLARITY |
|---|---|---|---|---|
| Product D1 | 1 | 10.8 | 145 | 13 |
|  | 2 | 67.6 | 111 | 7 |
|  | 3 | 102.0 | 104 | 8 |
| Product D2 | 1 | 7.7 | 108 | 16 |
|  | 2 | 57.1 | 118 | 8 |
|  | 3 | 128.8 | 108 | 9 |
| Product D3 | 1 | 8.3 | 153 | 14 |
|  | 2 | 57.9 | 114 | 8 |
|  | 3 | 113.2 | 104 | 8 |
| Comparative Product D | 1 | 7.4 | 162 | 18 |
|  | 2 | 33.1 | 132 | 10 |
|  | 3 | 56.5 | 120 | 8 |

All samples containing sodium maleate provide benefit over that without sodium maleate. Optimum results are provided by product D2.

Example 7

A slurry made to stimulate the red mud washers of a Bayer plant was prepared using the following ratios of ingredients taken from an operational plant:

Thickener underflow 1 part
First washer overflow 2 parts
Second washer overflow 1 part The slurry was mixed and stored in a hot box at 95° C. This slurry has the following characteristics.

Solids 160 g/l
Total Alkali 171.9 g/l
Total Caustic 144.1 g/l
$Al_2O_3$ 93.8 g/l 500 ml of the slurry were taken in 500 ml measuring cylinders and mixed using 5 strokes of a plunger. The same products as in Example I were used. Dose levels ranging from 4 to 8 mg/l were added to individual cylinders and mixing was achieved by a total of 4 strokes of a plunger. The settlement rate of the solids was recorded, the underflow volume was measured after allowing 30 minutes settlement and the underflow solids calculated.

The solids remaining in the overflow after 30 minutes were determined by removing a 50ml aliquot and filtering through a pre-weighed filter paper. The residue was washed with deionised water. The filter paper and residue was oven-dried and then reweighed to allow the solids to be calculated.

| Product | Dose (mg/l) | Settlement Rate (m/hr) | Underflow Solids (g/l) | Overflow Solids (g/l) |
|---|---|---|---|---|
| Product A | 4.0 | 2.58 | 171 | 0.43 |
|  | 5.3 | 4.38 | 195 | 0.53 |
|  | 6.0 | 7.11 | 222 | 0.46 |
|  | 6.7 | 11.4 | 240 | 0.34 |
| Comparative Product A | 4.0 | 3.19 | 167 | No result available |
|  | 5.3 | 4.66 | 192 | 0.46 |
|  | 6.7 | 6.7 | 222 | 0.33 |
|  | 8.0 | 11.3 | 240 | 0.36 |

We claim:

1. A process for separating suspended solids from a Bayer process liquor comprising flocculating the suspended solids by adding an effective flocculating amount of a water soluble flocculant polymer and then separating the flocculated solids from the liquor, wherein the flocculant polymer has intrinsic viscosity at least 10 dl/g and is a copolymer of recurring units derived from at least 5 mole percent maleic acid, at least 10 mole percent acrylic acid and at least 5 mole percent acrylamide.

2. A process according to claim 1, wherein the flocculant polymer has intrinsic viscosity at least 10 dl/g and is a copolymer consisting essentially of recurring units derived from 5 to 50 mole percent maleic acid, at least 10 mole percent acrylic acid and at least 5 mole percent acrylamide.

3. A process according to claim 1, wherein the flocculant polymer has intrinsic viscosity at least 10 dl/g and is a copolymer consisting essentially of recurring units derived from 5 to 50 mole percent maleic acid, at least 20 mole percent acrylic acid and at least 10 mole percent acrylamide.

4. A process according to claim 1, wherein at least 80% of the carboxylic acid groups in the polymer are neutralized as sodium salt.

5. A process according to claim 1, wherein the polymer has an anionic content of at least 0.5 meq/g.

* * * * *